US009826387B2

(12) United States Patent
Hu et al.

(10) Patent No.: US 9,826,387 B2
(45) Date of Patent: Nov. 21, 2017

(54) INDICATING A DRIVE STATUS IN COMMUNICATIONS

(71) Applicant: ABB Technology Oy, Helsinki (FI)

(72) Inventors: Zhongliang Hu, Espoo (FI); Teemu Tanila, Espoo (FI); Mikko Kohvakka, Espoo (FI)

(73) Assignee: ABB Technology OY (FI)

( * ) Notice: Subject to any disclaimer, the term of this patent is extended or adjusted under 35 U.S.C. 154(b) by 0 days.

(21) Appl. No.: 14/932,292

(22) Filed: Nov. 4, 2015

(65) Prior Publication Data

US 2017/0127262 A1     May 4, 2017

(51) Int. Cl.
*H04W 8/00* (2009.01)
*H02M 5/297* (2006.01)
*H04W 84/18* (2009.01)

(52) U.S. Cl.
CPC .......... *H04W 8/005* (2013.01); *H02M 5/297* (2013.01); *H04W 84/18* (2013.01)

(58) Field of Classification Search
CPC ..... H04W 8/005; H04W 84/18; H02M 5/297; G08G 5/0013; G08G 5/0021
USPC .................................... 455/66.1, 91
See application file for complete search history.

(56) References Cited

U.S. PATENT DOCUMENTS

| 4,642,992 | A | * | 2/1987 | Julovich | ................. | F01K 9/003 |
| | | | | | | 165/300 |
| 4,805,118 | A | * | 2/1989 | Rishel | ....................... | G01L 3/26 |
| | | | | | | 340/606 |
| 5,743,715 | A | * | 4/1998 | Staroselsky | ............ | F04D 27/02 |
| | | | | | | 415/1 |
| 6,045,331 | A | * | 4/2000 | Gehm | ..................... | A01J 5/007 |
| | | | | | | 417/2 |
| 6,298,218 | B1 | * | 10/2001 | Lowe | ...................... | G09F 27/00 |
| | | | | | | 455/310 |
| 6,560,235 | B1 | * | 5/2003 | Jones | ................. | G05B 19/0423 |
| | | | | | | 370/401 |
| 6,816,730 | B2 | * | 11/2004 | Davies | .................. | H04W 84/18 |
| | | | | | | 455/436 |

(Continued)

OTHER PUBLICATIONS

European Patent Office, Search Report for corresponding application EP16196778.1, dated Jul. 10, 2017, 22 pages.

*Primary Examiner* — Hai V Nguyen
(74) *Attorney, Agent, or Firm* — Taft Stettinius & Hollister LLP

(57) ABSTRACT

An automated power conversion device obtains information on an operational status of the automated power conversion device. Based on the obtaining, the automated power conversion device causes wireless transmission of advertising messages by using a non-connected signalling mode, such that the advertising messages comprise the information on the operational status of the automated power conversion device and are receivable by at least one terminal device of a communications system when the terminal device is located within the listening range of the connectionless signalling mode. The terminal device receives from the automated power conversion device, at least one of said advertising messages when the terminal device is located within the listening range of the connectionless signalling mode. Based on the receiving the terminal device informs the user of the terminal device on the operational status of the automated power conversion device.

27 Claims, 5 Drawing Sheets

(56) References Cited

U.S. PATENT DOCUMENTS

| | | | | |
|---|---|---|---|---|
| 6,928,263 B2* | 8/2005 | Blake | | H04B 1/713 375/E1.033 |
| 7,143,016 B1* | 11/2006 | Discenzo | | G05B 13/0265 703/3 |
| 7,624,452 B2* | 11/2009 | Young | | H04L 67/02 726/30 |
| 7,775,056 B2* | 8/2010 | Lowenstein | | F25D 29/00 236/51 |
| 8,065,025 B2* | 11/2011 | Virolainen | | G05B 19/0426 235/419 |
| 8,523,073 B2* | 9/2013 | Tam | | G06F 9/44505 235/435 |
| 8,856,323 B2* | 10/2014 | Enns | | H04L 29/08729 709/202 |
| 8,890,669 B2* | 11/2014 | Du | | B60R 25/10 340/426.1 |
| 8,994,388 B2* | 3/2015 | Wang | | G01R 31/42 324/713 |
| 9,013,902 B2* | 4/2015 | Abe | | H02J 3/00 307/31 |
| 9,018,862 B2* | 4/2015 | Itoigawa | | H02P 5/74 318/34 |
| 9,078,095 B2* | 7/2015 | Johnson | | H04W 4/02 |
| 9,091,259 B2* | 7/2015 | Tamminen | | F04B 49/00 |
| 9,178,356 B2* | 11/2015 | Bryson | | H02J 3/385 |
| 9,331,479 B2* | 5/2016 | Imai | | G01D 3/10 |
| 9,456,295 B2* | 9/2016 | Choi | | H04W 4/008 |
| 9,510,316 B2* | 11/2016 | Skaaksrud | | H04W 12/06 |
| 2001/0019495 A1* | 9/2001 | Miettinen | | H02M 7/003 363/157 |
| 2002/0034946 A1* | 3/2002 | Davies | | H04W 84/18 455/436 |
| 2002/0151993 A1* | 10/2002 | Olesen | | H02P 23/0077 700/86 |
| 2002/0183004 A1* | 12/2002 | Fulton | | H04W 4/06 455/41.1 |
| 2004/0077313 A1* | 4/2004 | Oba | | H04L 63/0492 455/41.2 |
| 2004/0229568 A1* | 11/2004 | Lowe | | G09F 27/00 455/66.1 |
| 2005/0090978 A1* | 4/2005 | Bathory | | G08G 5/0013 701/469 |
| 2005/0195537 A1* | 9/2005 | Virolainen | | G05B 19/0426 361/18 |
| 2006/0039450 A1* | 2/2006 | Fulton | | H04B 1/7156 375/133 |
| 2007/0162751 A1* | 7/2007 | Braskich | | H04L 63/062 713/169 |
| 2008/0016350 A1* | 1/2008 | Braskich | | H04L 9/0833 713/169 |
| 2008/0184719 A1* | 8/2008 | Lowenstein | | F25D 29/00 62/127 |
| 2008/0262910 A1* | 10/2008 | Altberg | | G06Q 30/02 705/14.69 |
| 2008/0263458 A1* | 10/2008 | Altberg | | H04L 12/66 715/757 |
| 2010/0259404 A1* | 10/2010 | Cho | | H04L 12/2825 340/679 |
| 2011/0055606 A1* | 3/2011 | Wu | | G06F 1/3203 713/323 |
| 2011/0081255 A1* | 4/2011 | Steger | | F04D 15/0066 417/44.1 |
| 2011/0136466 A1* | 6/2011 | Pan | | H04L 12/6418 455/404.2 |
| 2011/0153818 A1* | 6/2011 | Vandwalle | | H04L 67/16 709/224 |
| 2012/0123633 A1* | 5/2012 | Uyeki | | B60L 3/12 701/33.2 |
| 2012/0173035 A1* | 7/2012 | Abe | | H02J 3/00 700/297 |
| 2012/0200411 A1* | 8/2012 | Best | | G08G 1/096775 340/539.13 |
| 2012/0257561 A1* | 10/2012 | Redding | | H04L 12/1827 370/312 |
| 2013/0002413 A1* | 1/2013 | Du | | B60R 25/10 340/426.1 |
| 2013/0079009 A1* | 3/2013 | Aumann | | H04W 16/02 455/436 |
| 2013/0082098 A1* | 4/2013 | Tam | | G06F 9/44505 235/375 |
| 2013/0094599 A1* | 4/2013 | Itoigawa | | H04B 3/52 375/259 |
| 2013/0187663 A1* | 7/2013 | Wang | | G01R 31/28 324/537 |
| 2013/0288600 A1 | 10/2013 | Kuusilinna et al. | | |
| 2013/0297704 A1* | 11/2013 | Alberth, Jr. | | H04L 67/303 709/205 |
| 2013/0339498 A1* | 12/2013 | Johnson | | H04W 4/02 709/221 |
| 2014/0060100 A1* | 3/2014 | Bryson | | H02J 3/385 62/235.1 |
| 2014/0062191 A1* | 3/2014 | Bryson | | H02J 1/12 307/26 |
| 2014/0062206 A1* | 3/2014 | Bryson | | H02J 3/385 307/80 |
| 2014/0155050 A1* | 6/2014 | Choi | | H04W 4/008 455/418 |
| 2014/0180485 A1* | 6/2014 | Stavale | | F04D 15/0066 700/282 |
| 2014/0206286 A1* | 7/2014 | Palin | | H04W 8/005 455/41.2 |
| 2014/0222248 A1* | 8/2014 | Levien | | B64C 39/024 701/2 |
| 2014/0280497 A1 | 9/2014 | Nixon et al. | | |
| 2014/0308902 A1* | 10/2014 | Ricci | | H04W 48/04 455/66.1 |
| 2014/0337045 A1* | 11/2014 | Scrivner | | G06F 19/3468 705/2 |
| 2015/0048157 A1* | 2/2015 | Juslin | | G05B 19/0426 235/375 |
| 2015/0199655 A1* | 7/2015 | Carey | | G06Q 10/20 358/1.15 |
| 2015/0199656 A1* | 7/2015 | Carey | | G06Q 10/20 358/1.15 |
| 2015/0236182 A1* | 8/2015 | Moslehi | | H01L 31/0475 136/249 |
| 2015/0244247 A1* | 8/2015 | Chen | | H02M 7/4826 363/131 |
| 2015/0347959 A1* | 12/2015 | Skaaksrud | | G06Q 10/0833 705/333 |
| 2015/0349917 A1* | 12/2015 | Skaaksrud | | G06Q 10/0833 370/328 |
| 2016/0007525 A1* | 1/2016 | Drew | | A01D 34/006 56/10.2 R |
| 2016/0087579 A1* | 3/2016 | Moslehi | | H01L 31/0516 136/251 |
| 2016/0150135 A1* | 5/2016 | Chen | | F21V 33/0052 348/151 |
| 2016/0155317 A1* | 6/2016 | Rostami | | G08B 21/18 340/539.26 |
| 2016/0227162 A1* | 8/2016 | Bargetzi | | H04W 4/06 |
| 2016/0227381 A1* | 8/2016 | Bargetzi | | H04W 4/06 |

\* cited by examiner

Status OK

Status: Warning

Status: Fault

INDICATING A DRIVE STATUS IN COMMUNICATIONS

TECHNICAL FIELD

The invention relates to communications, and particularly to communications between an automated power conversion device and a terminal device.

BACKGROUND

The following background description art may include insights, discoveries, understandings or disclosures, or associations together with disclosures not known to the relevant art prior to the present invention but provided by the present disclosure. Some such contributions disclosed herein may be specifically pointed out below, whereas other such contributions encompassed by the present disclosure the invention will be apparent from their context.

Frequency converters are used to change frequency and magnitude of electricity supplied to a load. Frequency converters are being used for example in alternating current (AC) motor drives. In exemplary operation, a frequency converter receives AC current from an electrical power supply and converts the frequency of the received AC current to another frequency after which the AC current is supplied to an AC electric motor. Also further parameters, for example, a voltage level of the received AC current may be changed. The AC motors are used in various applications including for example fans and pumps. In many applications the use of frequency converters may provide significant energy savings compared to supplying electrical power having a constant frequency.

A local user of a frequency converter, e.g. maintenance staff or a customer, may start a local connection between the frequency converter and a mobile device or computer via a wireless connection, such as Bluetooth connection, Bluetooth low energy connection or WiFi connection. This means that the local user needs to establish a wireless link between the frequency converter and the mobile device and go through an authentication process before frequency converter status information is readable on the mobile device. This may take quite a long time, especially if the status of a large number of frequency converters is to be checked.

BRIEF DESCRIPTION

The following presents a simplified summary of features disclosed herein to provide a basic understanding of some exemplary aspects of the invention. This summary is not an extensive overview of the invention. It is not intended to identify key/critical elements of the invention or to delineate the scope of the invention. Its sole purpose is to present some concepts disclosed herein in a simplified form as a prelude to a more detailed description.

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide a method, system, apparatus and a computer program product for indicating a status of an automated power conversion device.

BRIEF DESCRIPTION OF DRAWINGS

In the following the invention will be described in greater detail by means of preferred embodiments with reference to the attached drawings, in which.

DETAILED DESCRIPTION OF THE INVENTION

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
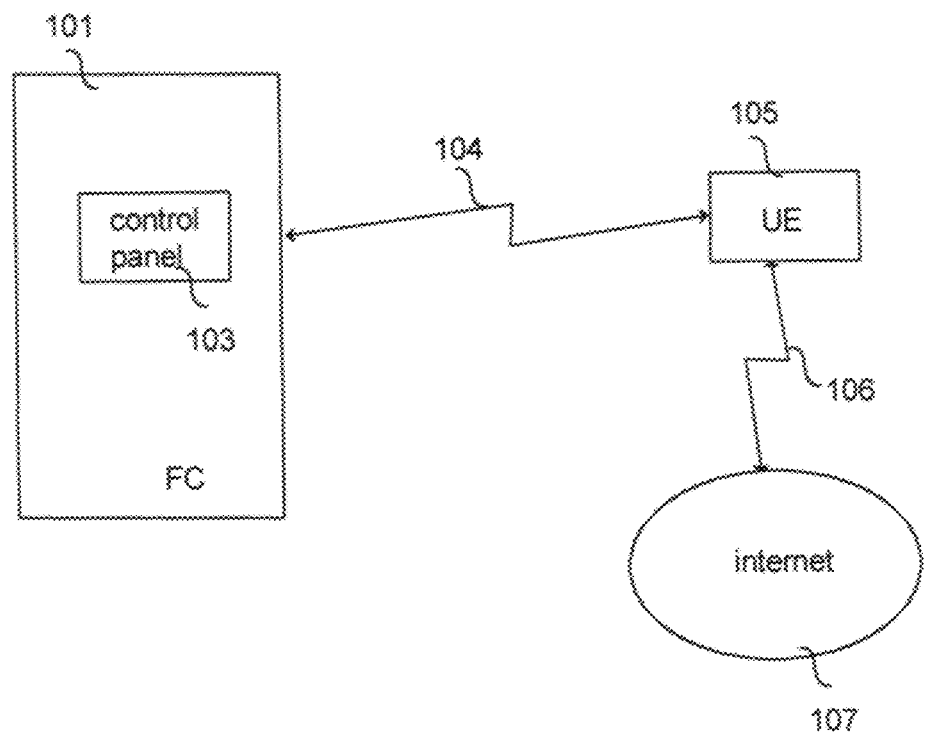
FIG. 1 illustrates a wireless communication system to which embodiments of the invention may be applied.

FIG. 1 illustrates a wireless communication scenario to which embodiments of the invention may be applied. Referring to FIG. 1, an example of a radio system to which embodiments of the invention may be applied, is based on LTE network elements. However, an embodiment is not limited to the LTE radio communications systems but may also be implemented in other radio communications systems, such as 3G, 4G, 5G, LTE-A, UMTS (universal mobile telecommunications system), EDGE, WCDMA, Bluetooth network, WiFi, WLAN or any other mobile or wireless network. In an embodiment, the presented solution may be applied between user equipment belonging to different but compatible systems such as LTE and UMTS.

A general architecture of a communication system is illustrated in FIG. 1. FIG. 1 illustrates a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements, and protocols used in or for wireless communication are irrelevant to the actual invention. Therefore, they need not be discussed in more detail here.

FIG. 1 illustrates a communication system according to an embodiment. FIG. 1 illustrates an exemplary communications system in which a user terminal 105 is able to connect to the internet 107 and to one or more frequency converters 101. The user terminal 105 may be a local terminal device (local device) located on-site at a close proximity of the frequency converter 101. The local terminal device 105 may comprise a user equipment such as a smartphone, mobile phone, tablet computer or laptop computer. A connection 106 of the local terminal device 105 to the internet 107 may be provided by a cellular, wireless or wired link. A connection 104 of the local terminal device 105 to the frequency converter 101 may be provided e.g. by a Bluetooth, Bluetooth low energy, WiFi, wireless mesh network, NFC (near field communication), and/or inductive connection (such as an inductive connection according to an inductive power standard (Qi) by the Wireless Power Consortium).

A network apparatus 109 may be a remote device such as a remote terminal device, server or database located at a service center, for facilitating service and maintenance of the frequency converter 101. The remote device 109 may facilitate different ways of how to communicate with the frequency converter 101 via the local terminal device 105. The remote device 109 may comprise e.g. a desktop computer, laptop computer, tablet computer, smartphone, mobile phone, server, database, etc. Any suitable technology that makes it possible to store frequency converter history data and other frequency converter specific data into a service center database 111 may be utilized. For example, a cloud service (cloud computing) may be used via the internet 107 to store frequency converter history data and other frequency converter data into the service center database 111. The local and remote devices may be capable of communicating with each other via the internet 107 by utilizing the cloud service.

Figure 3:
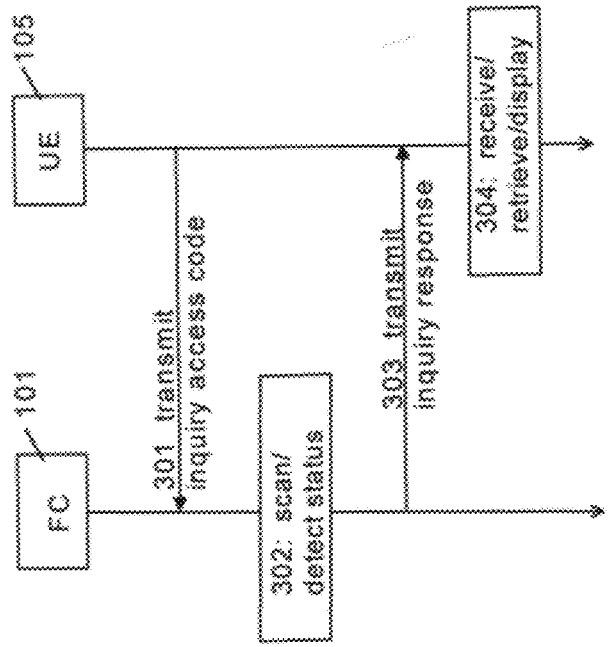
FIGS. 2 and 3 are signalling diagrams of procedures for indicating an automated power conversion device status according to an embodiment of the invention.
Figure 2:
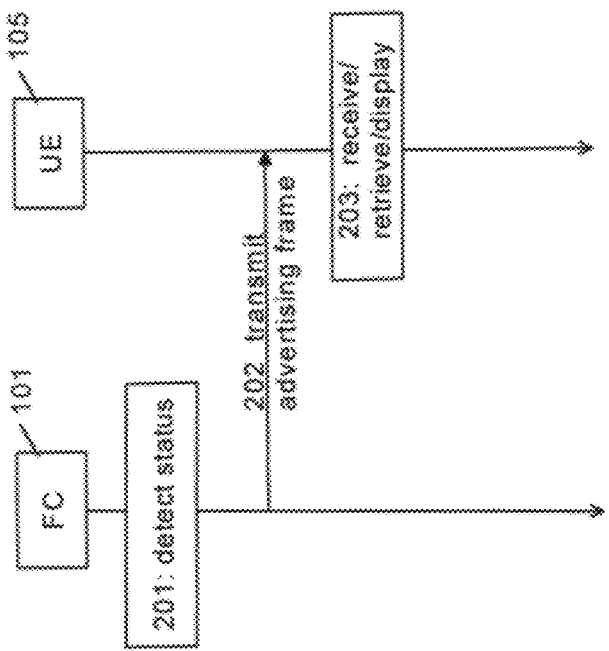

Let us now describe an embodiment of the invention with reference to FIGS. 2 and 3. FIGS. 2 and 3 are signalling diagrams illustrating methods for signalling frequency converter data between a frequency converter, and network nodes of a communication system, such as the local terminal device 105. The network node may be a terminal device, user equipment, host computer, server computer, base station, access node or any other network element. For example, the server computer or the host computer may generate a virtual network through which the host computer communicates with the terminal device.

Referring to FIG. 2, the frequency converter 101 is configured to obtain (item 201) information on an operational status of the frequency converter 101. For example, the information on the frequency converter operational status may indicate a fault status, warning status, normal operation and/or some other status(es) of the frequency converter 101. Based on the obtaining, the frequency converter is configured to cause (item 202) wireless transmission of advertising messages by using a non-connected signalling mode. The advertising messages comprise the information on the operational status of the frequency converter 101 and are receivable by at least one terminal device 105 of a communications system when the terminal device 105 is located within the listening range of the connectionless signalling mode. The advertising message may comprise, for example, a Bluetooth low energy advertising frame, a WiFi beacon frame, or a broadcast message of a wireless mesh network (such as a beacon frame of a ZigBee network according to IEEE 802.15.4). The information on the frequency converter operational status may be transmitted in an UUID field, local name field, service data field, manufacturer specific data field and/or some other data field of the advertising message. The frequency converter operational status may be indicated in the advertising message e.g. by means of a predefined frequency converter status code.

The terminal device 105 is configured to receive (item 203) from the frequency converter 101, at least one of the advertising messages 202 when the terminal 101 is located within the listening range of the connectionless signalling mode. Based on the receiving, the terminal device 105 is configured to inform (203) the user of the terminal device 105 on the operational status of the frequency converter 101. The informing the user of the terminal device 105 on the operational status of the frequency converter 101 may comprise displaying the predefined status code and/or further on the status of the frequency converter 101 on a display of the terminal device 105. The terminal device may be configured to retrieve the further information (such as the meaning of the status code, troubleshooting instructions, related user guides, white papers, videos, contact details of the service, and/or other related information) from a remote device 109, remote database 111 (such as a cloud service), or from the memory of the terminal device 105 based on the predefined status code. Information on the predefined frequency converter status codes may be stored in the frequency converter, in the terminal device and/or in a remote device.

By using connectionless broadcasting, a Bluetooth low energy device may operate in an advertisement mode to notify nearby devices of its presence. The Bluetooth low energy device emits advertisement packets having a predefined format. The frequency converter 101 may represent a broadcaster that sends non-connectable advertising packets periodically to any wireless device capable of receiving them. The terminal device 105 may observe/repeatedly scan pre-set frequencies to receive any non-connectable advertising packets that are being broadcasted. The advertising packet includes data that identifies the broadcaster. The advertisement packets may be received by any scanning device or receiver in the listening range.

Regarding a pairing procedure, the Bluetooth classic technology uses a pull model, instead of the push model used in the Bluetooth low energy technology. In the Bluetooth low energy technology, the frequency converter that wishes to be discovered by the terminal device, is configured to use broadcast advertising (or beacons) at the area towards the terminal device listening to such broadcasts, whereas in the Bluetooth classic technology the frequency converter wishing to be discovered by the terminal device is placed in a listening mode for broadcasts from inquiring terminal devices before sending the frequency converter information from the frequency converter to the terminal device.

Referring to FIG. 3, the terminal device 105 is configured to broadcast 301 inquiry access code (IAC) messages towards Bluetooth classic devices such as the frequency converter 101. For example, the user of the terminal device may open an application in terminal device 105, and the terminal device 105 may start sending the inquiry access code over Bluetooth radio channels. The frequency converter 101 in a standby state is configured to periodically enter an inquiry scan state to search for IAC messages. Thus the frequency converter 101 in the listening range may receive (item 302) the inquiry access code (IAC) message from the terminal device 105. The frequency converter 101 is configured to obtain (item 302) information on an operational status of the frequency converter 101. For example, the information on the frequency converter operational status may indicate a fault status, warning status, normal operation and/or some other status(es) of the frequency converter 101. In response to the reception of the inquiry access code (IAC) message, the frequency converter is configured to cause (item 303) wireless transmission of an extended inquiry response to the terminal device 105. The extended inquiry response message comprises the information on the operational status of the frequency converter 101 and is receivable the terminal device 105 when the terminal device 105 is located within the listening range of the frequency converter. The extended inquiry response message may comprise, for example, a Bluetooth classic extended inquiry response message. The frequency converter operational status may be indicated in the extended inquiry response message e.g. by means of a predefined frequency converter status code.

The terminal device 105 is configured to receive (item 304) from the frequency converter 101, the extended inquiry response 303 when the terminal device 101 is located within the listening range of the frequency converter 101. Based on the receiving, the terminal device 105 is configured to inform (304) the user of the terminal device 105 on the operational status of the frequency converter 101. The informing the user of the terminal device 105 on the operational status of the frequency converter 101 may comprise displaying the predefined status code and/or further information on the status of the frequency converter 101 on a display of the terminal device 105. The terminal device may be configured to retrieve 304 the further information (such as the meaning of the status code, troubleshooting instructions, related user guides, white papers, videos, contact details of the service, and/or other related information) from a remote device 109, remote database 111 (such as a cloud service), or from the memory of the terminal device 105 based on the predefined status code. Information on the predefined frequency converter status codes may be stored in the frequency converter, in the terminal device and/or in a remote device.

Thus the Bluetooth classic technology uses an inquiry procedure to search for other devices. The inquiry procedure is invoked when a potential master identifies the devices on the listening range that wish to participate in a piconet. In an inquiry state (inquiry mode), the master (herein the terminal device) sends an inquiry access code (IAC) message ("inquiry message") over each of the 32 wake-up carriers (out of 79) in turn. Devices in a standby state (herein the frequency converter) periodically enter an inquiry scan state to search for the IAC messages. When the frequency converter receives the IAC message, the frequency converter enters an inquiry response state and returns an FHS (frequency hopping synchronization) message ("response message") to the terminal device.

Wireless technologies may utilize advertising messages to advertise the presence and features of a wireless station. The wireless station performs scanning of advertising messages for discovering compatible wireless stations on the discovery range, and according to the scanning results selects a suitable wireless station for communication. For example, in Bluetooth 4.0 (low energy) technology the advertising frame may comprise following data fields: service universally unique identifier (UUID), local name, service data and manufacturer specific data.

In an embodiment, a frequency converter equipped with a Bluetooth low energy device transmits information on its frequency converter status in the advertising message, e.g. in the UUID field, local name data field, service data field, manufacturer specific data field, and/or some other data field. The advertising message including the information on the frequency converter status may then be received in the mobile device located on the discovery range of the Bluetooth low energy device.

In an embodiment, the frequency converter is equipped with a Bluetooth low energy module and uses a predefined UUID (or a predefined discovery range) that enables filtering the scanning results to include selected frequency converters only, e.g. the frequency converters of a certain company only.

In an embodiment, the frequency converter is configured to transmit the Bluetooth advertising frames at predetermined (short) intervals.

In an embodiment, the frequency converter is configured to go to the inquiry scan mode at predetermined (short) intervals.

For example, only warning and fault statuses may be used, which are denoted e.g. with symbols W and F. Also, more complex error codes may be used to provide more specific information of the problem. If the frequency converter status is "ok" or "normal", it may be indicated by a specific symbol as well. For example, the ok status may be indicated by an empty status symbol.

In an embodiment, the frequency converter may have multiple statuses active at the same time. The frequency converter may be configured to send multiple statuses in the same message/frame or divide the multiple statuses on consecutive frames/messages. To be able to show the most important status(es) to the user, statuses may be prioritized in the frequency converter and/or in the terminal device. For example, fault may have the highest priority, warning may have the second highest priority, and other statuses, such as limits, may have the third highest priority, etc. The user terminal may be configured to display each active status on the user interface, or only the most important status(es), depending on the implementation. If multiple status codes apply (i.e. are active), the user terminal may be configured to alternate the status code displayed on the user interface.

In an embodiment, the mobile device (mobile phone or any other suitable Bluetooth low energy enabled device) is not required to connect/pair with the frequency converter, but may simply scan the predefined known UUID range and gather the specific advertising frame(s) including frequency converter status information. Thus, the mobile device is quickly and easily able to see the status of each Bluetooth low energy equipped frequency converter (or each Bluetooth low energy equipped frequency converter by a certain company, for example) on the range and thus be notified if one or more frequency converters requires the local user's attention.

An embodiment is applicable to any wireless communication technology that utilizes some type of advertising messages and/or inquiry responses.

In an embodiment, the local user using the scanning application when walking through a large factory having several frequency converters may quickly be notified by the mobile device if one or more of the frequency converters is in an abnormal state, while the other frequency converters are online and running well. Based on the status information received from the frequency converter(s) s/he may then go to the problematic frequency converter(s) to perform further investigation.

In an embodiment, the end user experience is increased. A much shorter time is needed for the end user to realize what the fault is, as there is no need to establish an actual connection between the frequency converter and the mobile device in order to read the frequency converter status information, since it is already known from the drive name and the mobile device containing the scanning application is able to indicate the fault number and how to solve it. The end user work efficiency is increased, because the end user is able to quickly scan a large amount of frequency converters that support this feature, enabling the "walking through" experience. This means that one may start the scanning process, walk through the factory, and be notified only if there are issues regarding the frequency converters that may require measures to be taken.

In an embodiment, the mobile device performs the scanning continuously, and notifies the user whenever there is a problem detected. The user may then connect to the frequency converter and perform further checking normally.

The end user experience may be increased, as the end user is notified wirelessly (within a much larger listening range) if there are any issues with the frequency converters, instead of having to go to check each frequency converter individually. The end user gets to know the status of the frequency converter when the end user is on the listening range of the advertising messages/inquiry responses sent by the frequency converter.

In an embodiment, the terminal device containing the scanning application may notify a central system such as a cloud server when a fault occurs in the frequency converter. The notified information may be stored and analysed centrally in a remote device in order to improve service capability.

For example, let us assume that Thomas is working as a factory manager in Germany where his factory currently employs 5 frequency converters of different models including "model A", "model B" and "model C", each equipped with a Bluetooth low energy wireless panel. Thomas walks through the factory every morning and checks the general conditions, while he also has the frequency converter scanning application open on his mobile device. This morning when he was doing such a walk his mobile device alerted. He checked the mobile device and realized that one of the frequency converters located on the other side of the factory had indicated an error of "earth leakage" with a fault code of "K1, Z L2". By means of the scanning application loaded on the mobile device, he is immediately able to find out that this is typically caused by "earth fault in motor or motor cable". Without the scanning application he would not have noticed this fault, since the frequency converter in question and its user panel are in a location where he normally would not check. By means of the scanning application he found out that there is a fault, and also has an idea of the quality of the fault.

In an embodiment, the mobile device in configured to inform the user if the frequency converter status changes.

In an embodiment, the information on the operational status of the frequency converter may (in addition to/instead of a fault status, warning status or normal operation status) indicate a limit status, e.g. the motor speed, torque and/or current being on maximum or minimum allowed. In an embodiment, the information on the operational status may indicate a fault code, warning code and/or limit code that gives more specific information on the frequency converter.

Figure 4:
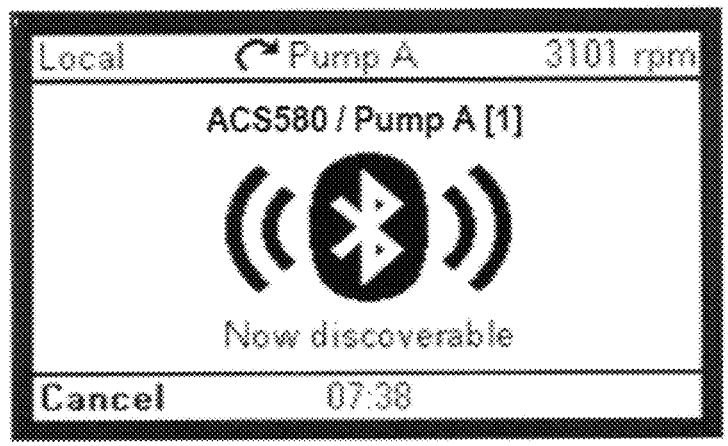
FIG. 4 illustrates exemplary local name change.
Figure 4:
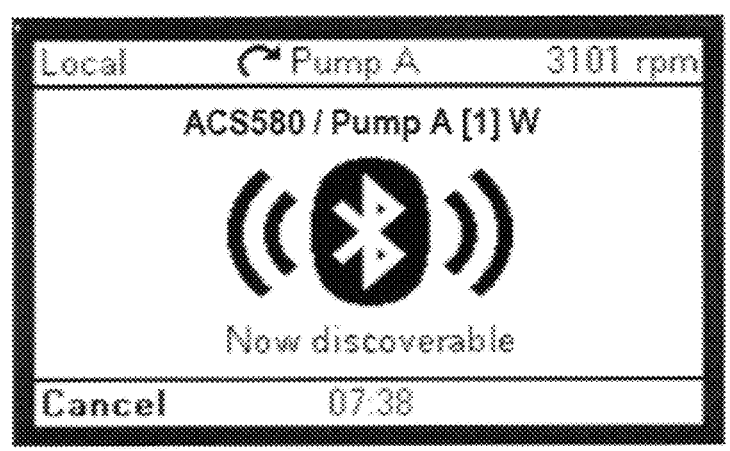
Figure 4:
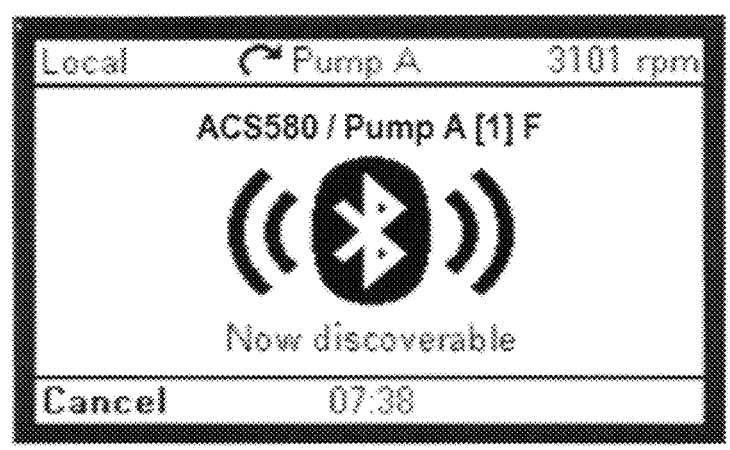

FIG. 4 illustrates exemplary local name change as displayed on the control panel of the frequency converter in case of warning and fault conditions, where warning is indicated with W and fault is indicated with F, at the end of the local name field.

Figure 5:
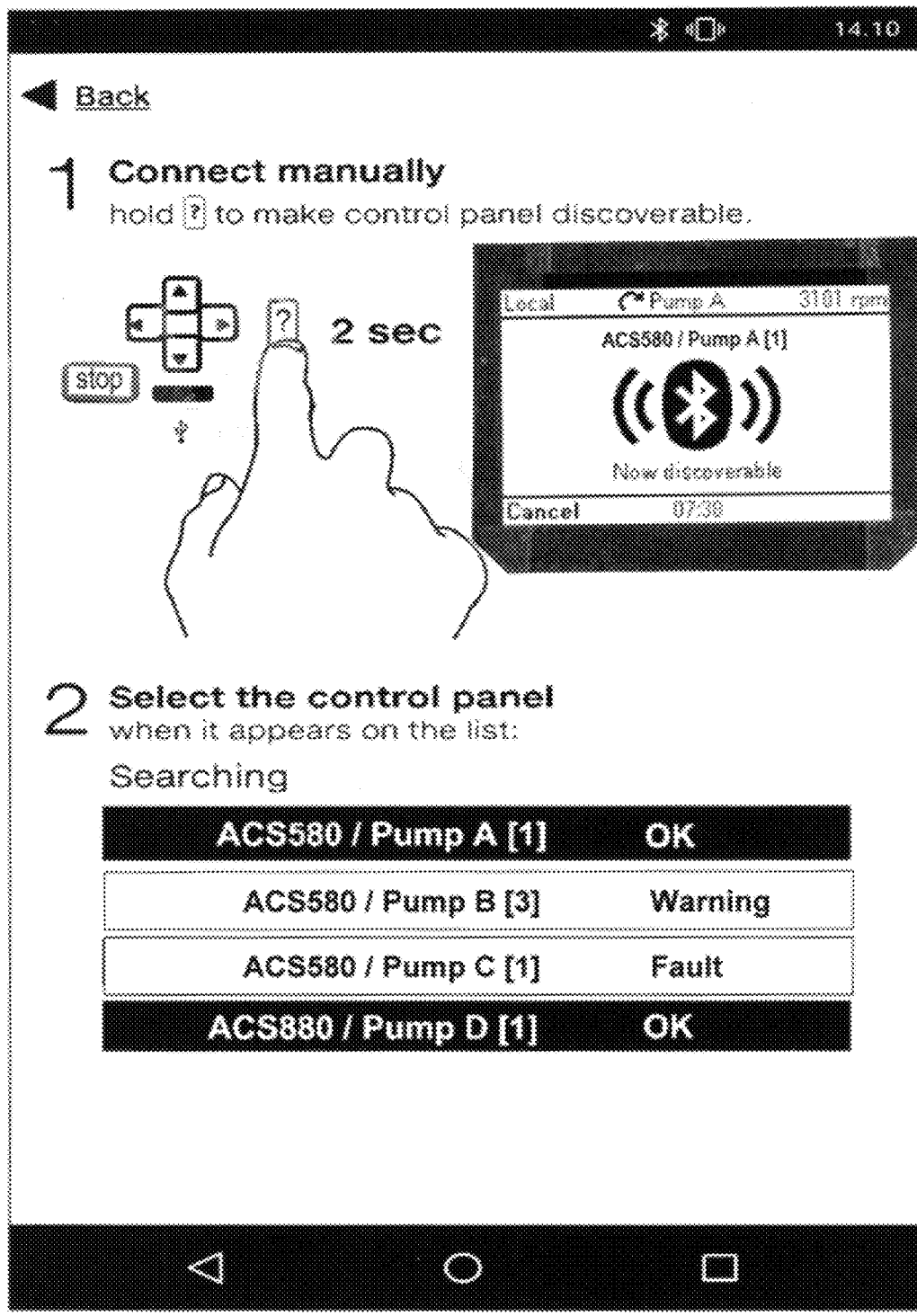
FIG. 5 illustrates exemplary scan results displayed by a scanning application.

FIG. 5 illustrates exemplary scanning results displayed by the scanning application in the mobile device, where frequency converters with ok, warning or fault statuses are indicated.

In addition to a drive system/frequency converter, an embodiment may also be applicable to other automated power conversion devices (or industrial automation devices) such as DC/DC modules, AC/DC modules, DC/AC modules, programmable logic controllers, switches, motion controllers, motion drives, servo motors, soft starters, robotics, cars, heavy equipment, etc. The automated power conversion device is configured to receive electrical current from an electrical power supply, convert the frequency of the received electrical current to another frequency, and after supply the electrical current to electric machinery (such as an electric motor).

Figure 6:
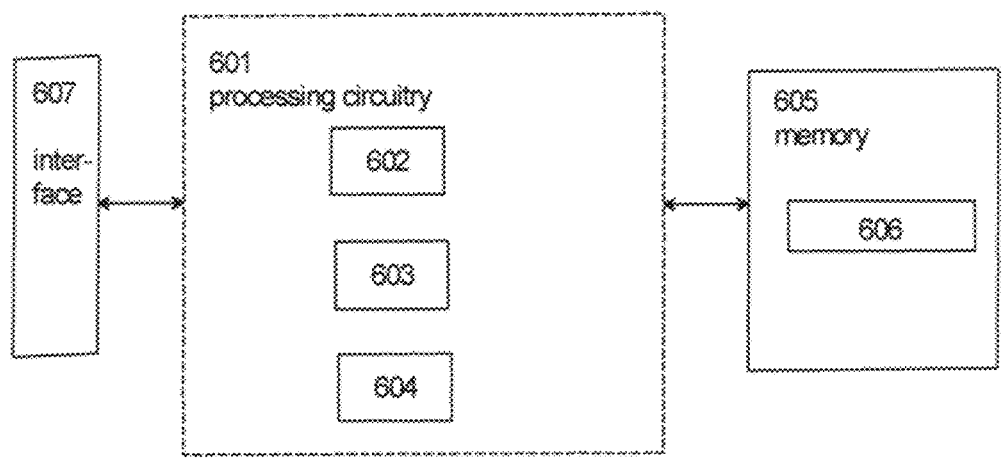
FIG. 6 illustrates a blocks diagram of an apparatus according to an embodiment of the invention.

An embodiment provides an apparatus comprising at least one processor and at least one memory including a computer program code, wherein the at least one memory and the computer program code are configured, with the at least one processor, to cause the apparatus to carry out the procedures of the above-described automated power conversion device. The at least one processor, the at least one memory, and the computer program code may thus be considered as an embodiment of means for executing the above-described procedures of the automated power conversion device. The apparatus may be comprised in the automated power conversion device, e.g. the apparatus may form a chipset or a circuitry in the automated power conversion device. In some embodiments, the apparatus is the automated power conversion device. FIG. 6 is a blocks diagram illustrating such an apparatus. The apparatus comprises a processing circuitry 601 comprising the at least one processor 602. The processing circuitry 601 may comprise a status retrieval circuitry 603 configured to obtain operational status information related to the automated power conversion device. The processing circuitry 601 may further comprise a communications controller 604 configured to wirelessly broadcast or transmit the information on the operational status in a message towards local terminal devices of a communications system.

The processing circuitry 601 may comprise the circuitries as subcircuitries, or they may be considered as computer program modules executed by the same physical processing circuitry. The memory 605 may store one or more computer program products comprising program instructions that specify the operation of the circuitries. The memory 605 may further store a database 606 comprising frequency controller history data, for example. The apparatus may further comprise an interface 607 providing the apparatus with communication capability with network nodes.

As used herein, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used herein, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described above in connection with FIGS. 1 to 6 may also be carried out in the form of one or more computer process defined by one or more computer programs. The computer program shall be considered to encompass also a module of a computer programs, e.g. the above-described processes may be carried out as a program module of a larger algorithm or a computer process. The computer program(s) may be in source code form, object code form, or in some intermediate form, and it may be stored in a carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to cellular, wireless or mobile communication systems defined above but also to other suitable communication systems. The protocols used, the specifications of cellular communication systems, their network elements, and terminal devices develop rapidly. Such development may require extra changes to the described embodiments. Therefore, all words and expressions should be interpreted broadly and they are intended to illustrate, not to restrict, the embodiment.

It will be obvious to a person skilled in the art that, as the technology advances, the inventive concept can be implemented in various ways. The invention and its embodiments are not limited to the examples described above but may vary within the scope of the claims.

The invention claimed is:

1. A method comprising
    obtaining, in an automated power conversion device, information on an operational status of the automated power conversion device;
    based on the obtaining, causing, in the automated power conversion device, wireless transmission of advertising messages by using a connectionless signalling mode, such that the advertising messages comprise the information on the operational status of the automated power conversion device and are receivable by at least one terminal device of a communications system when a terminal device is located within the listening range of the connection less signalling mode;
    receiving, in the terminal device from the automated power conversion device, at least one of said advertising messages when the terminal device is located within the listening range of the connectionless signalling mode;
    based on the receiving, informing, in the terminal device, the user of the terminal device on the operational status of the automated power conversion device.

2. A method according to claim 1, wherein the advertising message comprises a Bluetooth advertising frame, a WiFi beacon frame, or a broadcast message of a wireless mesh network.

3. A method according to claim 1, wherein the information on the automated power conversion device operational status is transmitted in at least one of an UUID field, local name field, service data field, manufacturer specific data field, and some other data field of the advertising message.

4. A method according to claim 1, wherein the information on the automated power conversion device operational status indicates at least one of a fault status, warning status, normal operation status, limit status, fault code, warning code, and limit code, of the automated power conversion device.

5. A method according to claim 1, wherein the automated power conversion device operational status is indicated in the advertising message or the response message by means of one or more predefined automated power conversion device status codes.

6. A method according to claim 1, wherein information on predefined automated power conversion device status codes is stored in at least one of the automated power conversion device, in the terminal device, and in a remote device.

7. A method according to claim 1, wherein the informing the user of the terminal device on the operational status of the automated power conversion device comprises displaying one or more of a status code, and further information on the status of the automated power conversion device, on a display of the terminal device.

8. A method according to claim 7, wherein the further information is retrieved from a remote device of the communications system or from the memory of the terminal device based on said one or more status codes.

9. A method according to claim 7, wherein the method comprises one or more of transmitting,
    from the automated power conversion device, one or more status codes within one message or frame;
    transmitting, from the automated power conversion device, status codes within consecutive messages or frames, if multiple status codes apply;
    transmitting, from the automated power conversion device, only one or more higher priority status codes, if multiple status codes apply;
    displaying, in the terminal device, only one or more higher priority status codes, if multiple status codes apply; and
    alternating the status code displayed in the terminal device, if multiple status codes apply.

10. A method comprising
    obtaining, in an automated power conversion device, information on an operational status of the automated power conversion device;
    periodically scanning, in the automated power conversion device, inquiry messages transmitted wirelessly from at least one terminal device of a communications system;
    based on the scanning, receiving an inquiry message in the automated power conversion device from a terminal device located within the listening range of the automated power conversion device;
    based on the received inquiry message, causing, in the automated power conversion device, wireless transmission of a response message to the terminal device, wherein the response message comprises the information on the operational status of the automated power conversion device;
    receiving, in the terminal device from the automated power conversion device, the response message, and
    based on the received response message, informing, in the terminal device, the user of the terminal device on the operational status of the automated power conversion device.

11. A method according to claim 10, wherein the response message comprises a Bluetooth extended inquiry response message.

12. A method according to claim 10, wherein the information on the automated power conversion device operational status indicates at least one of a fault status, warning status, normal operation status, limit status, fault code, warning code, and limit code, of the automated power conversion device.

13. A method according to claim 10, wherein the automated power conversion device operational status is indicated in the advertising message or the response message by means of one or more predefined automated power conversion device status codes.

14. A method according to claim 10, wherein information on predefined automated power conversion device status codes is stored in at least one of the automated power conversion device, in the terminal device, and in a remote device.

15. A method according to claim 10, wherein the informing the user of the terminal device on the operational status of the automated power conversion device comprises displaying one or more of a status code, and further information on the status of the automated power conversion device, on a display of the terminal device.

16. A method according to claim 15, wherein the further information is retrieved from a remote device of the communications system or from the memory of the terminal device based on said one or more status codes.

17. A method according to claim 15, wherein the method comprises one or more of
- transmitting, from the automated power conversion device, one or more status codes within one message or frame;
- transmitting, from the automated power conversion device, status codes within consecutive messages or frames, if multiple status codes apply;
- transmitting, from the automated power conversion device, only one or more higher priority status codes, if multiple status codes apply;
- displaying, in the terminal device, only one or more higher priority status codes, if multiple status codes apply; and
- alternating the status code displayed in the terminal device, if multiple status codes apply.

18. A communications system comprising
a terminal device, and
an automated power conversion device configured to receive electrical current from an electrical power supply, convert the frequency of the received electrical current to another frequency, and after that supply the electrical current to industrial machinery,
wherein the system is configured to
obtain, in the automated power conversion device, information on an operational status of the automated power conversion device;
based on the obtaining, cause, in the automated power conversion device, wireless transmission of advertising messages by using a connectionless signalling mode, such that the advertising messages comprise the information on the operational status of the automated power conversion device and are receivable by the terminal device when the terminal device is located within the listening range of the connectionless signalling mode;
receive, in the terminal device from the automated power conversion device, at least one of said advertising messages when the terminal device is located within the listening range of the connectionless signalling mode;
based on the receiving, inform, in the terminal device, the user of the terminal device on the operational status of the automated power conversion device.

19. A communications system comprising
a terminal device, and
an automated power conversion device configured to receive electrical current from an electrical power supply, convert the frequency of the received electrical current to another frequency, and after that supply the electrical current to industrial machinery,
wherein the system is configured to
obtain, in an automated power conversion device, information on an operational status of the automated power conversion device;
periodically scan, in the automated power conversion device, inquiry messages transmitted wirelessly from at least one terminal device of a communications system;
based on the scanning, receive an inquiry message in the automated power conversion device from a terminal device located within the listening range of the automated power conversion device;
based on the received inquiry message, cause, in the automated power conversion device, wireless transmission of a response message to the terminal device, wherein the response message comprises the information on the operational status of the automated power conversion device;
receive, in the terminal device from the automated power conversion device, the response message; and
based on the received response message, inform, in the terminal device the user of the terminal device on the operational status of the automated power conversion device.

20. An automated power conversion device comprising
at least one processor; and
at least one memory including a computer program code, wherein the at least one memory and the computer program code are configured, with the at least one processor, to cause the automated power conversion device to
obtain information on an operational status of the automated power conversion device;
based on the obtaining, cause wireless transmission of advertising messages from the automated power conversion device by using a connectionless signalling mode, wherein the advertising messages comprise the information on the operational status of the automated power conversion device and are receivable by at least one terminal device of a communications system when the terminal device is located within the listening range of the connectionless signalling mode.

21. An automated power conversion device comprising
at least one processor; and
at least one memory including a computer program code, wherein the at least one memory and the computer program code are configured, with the at least one processor, to cause the automated power conversion device to
obtain information on an operational status of the automated power conversion device;
periodically scan inquiry messages transmitted wirelessly from at least one terminal device of a communications system;
based on the scanning, receive an inquiry message from a terminal device located within the listening range of the automated power conversion device;
based on the received inquiry message, cause wireless transmission of a response message to the terminal device, wherein the response message comprises the information on the operational status of the automated power conversion device.

22. A terminal device comprising
at least one processor; and
at least one memory including a computer program code, wherein the at least one memory and the computer program code are configured, with the at least one processor, to cause the terminal device to receive, from an automated power conversion device, an advertising message transmitted wirelessly by using a connectionless signalling mode, wherein the advertising message comprises information on an operational status of the automated power conversion device and is receivable by the terminal device when the terminal device is located within the listening range of the connectionless signalling mode;

based on the receiving, inform the user of the terminal device on the operational status of the automated power conversion device.

23. A terminal device comprising
at least one processor; and
at least one memory including a computer program code, wherein the at least one memory and the computer program code are configured, with the at least one processor, to cause the terminal device to
cause wireless transmission of inquiry request messages, wherein the inquiry messages are receivable by at least one automated power conversion device located within the listening range of the terminal device;
receive an inquiry response message transmitted from the automated power conversion device by wireless transmission, wherein the response message comprises information on the operational status of the automated power conversion device;
based on the received response message, inform the user of the terminal device on the operational status of the automated power conversion device.

24. A drive system comprising the automated power conversion device of claim 20.

25. A drive system comprising the automated power conversion device of claim 21.

26. A computer program product embodied on a non-transitory distribution medium readable by a computer and comprising program instructions which, when loaded into the computer, execute a computer process comprising obtaining, in an automated power conversion device, information on an operational status of the automated power conversion device;

based on the obtaining, causing, in the automated power conversion device, wireless transmission of advertising messages by using a connectionless signalling mode, such that the advertising messages comprise the information on the operational status of the automated power conversion device and are receivable by at least one terminal device of a communications system when the terminal device is located within the listening range of the connectionless signalling mode;

receiving, in the terminal device from the automated power conversion device, at least one of said advertising messages when the terminal device is located within the listening range of the connectionless signalling mode;

based on the receiving, informing, in the terminal device, the user of the terminal device on the operational status of the automated power conversion device.

27. A computer program product embodied on a non-transitory distribution medium readable by a computer and comprising program instructions which, when loaded into the computer, execute a computer process comprising obtaining, in an automated power conversion device, information on an operational status of the automated power conversion device;

periodically scanning, in the automated power conversion device, inquiry messages transmitted wirelessly from at least one terminal device of a communications system;

based on the scanning, receiving an inquiry message in the automated power conversion device from a terminal device located within the listening range of the automated power conversion device;

based on the received inquiry message, causing, in the automated power conversion device, wireless transmission of a response message to the terminal device, wherein the response message comprises the information on the operational status of the automated power conversion device;

receiving, in the terminal device from the automated power conversion device, the response message; and based on the received response message, informing, in the terminal device, the user of the terminal device on the operational status of the automated power conversion device.

* * * * *